United States Patent
Okamoto et al.

(10) Patent No.: US 11,136,460 B2
(45) Date of Patent: Oct. 5, 2021

(54) ANTI-SLIP STRUCTURE AND COMPOSITION FOR ANTI-SLIP TREATMENT

(71) Applicant: SUNSTAR ENGINEERING INC., Takatsuki (JP)

(72) Inventors: Hirokazu Okamoto, Takatsuki (JP); Norihiro Tameno, Takatsuki (JP); Yoshimasu Tanaka, Takatsuki (JP)

(73) Assignee: SUNSTAR ENGINEERING INC., Takatsuki (JP)

( * ) Notice: Subject to any disclaimer, the term of this patent is extended or adjusted under 35 U.S.C. 154(b) by 171 days.

(21) Appl. No.: 15/763,635

(22) PCT Filed: Sep. 28, 2016

(86) PCT No.: PCT/JP2016/078646
§ 371 (c)(1),
(2) Date: Mar. 27, 2018

(87) PCT Pub. No.: WO2017/057473
PCT Pub. Date: Apr. 6, 2017

(65) Prior Publication Data
US 2018/0282546 A1    Oct. 4, 2018

(30) Foreign Application Priority Data
Sep. 30, 2015  (JP) .............................. JP2015-193845

(51) Int. Cl.
| | |
|---|---|
| *C08L 83/06* | (2006.01) |
| *C08L 101/00* | (2006.01) |
| *C08L 101/10* | (2006.01) |
| *C09D 183/04* | (2006.01) |
| *E04F 15/08* | (2006.01) |
| *C08G 65/336* | (2006.01) |
| *C08L 33/04* | (2006.01) |
| *C08L 71/02* | (2006.01) |
| *E04F 15/02* | (2006.01) |
| *E04F 15/12* | (2006.01) |

(52) U.S. Cl.
CPC ............ *C08L 83/06* (2013.01); *C08G 65/336* (2013.01); *C08L 33/04* (2013.01); *C08L 71/02* (2013.01); *C08L 101/00* (2013.01); *C08L 101/10* (2013.01); *C09D 183/04* (2013.01); *E04F 15/02172* (2013.01); *E04F 15/082* (2013.01); *E04F 15/12* (2013.01)

(58) Field of Classification Search
CPC .......... C08L 83/06; C08L 71/02; C08L 33/04; C08L 101/00; C08L 101/10; C08L 83/04; E04F 15/02172; E04F 15/12; E04F 15/082; C09D 183/04; C08G 65/336; C09K 3/149; C08K 5/56; C08K 5/54
See application file for complete search history.

(56) References Cited

U.S. PATENT DOCUMENTS

| | | | |
|---|---|---|---|
| 5,268,733 A * | 12/1993 | Wright | ............... G01B 11/26 356/138 |
| 6,486,288 B1 | 11/2002 | Ziche | |
| 6,673,417 B1 * | 1/2004 | Gudet | ............... B28B 3/021 15/215 |
| 2005/0238815 A1 | 10/2005 | Dvorchak | |
| 2006/0293456 A1 | 12/2006 | Saito | |

FOREIGN PATENT DOCUMENTS

| | | |
|---|---|---|
| CN | 1297955 A | 6/2001 |
| CN | 1690146 A | 11/2005 |
| CN | 101486822 B | 7/2011 |
| JP | S63-059372 A | 3/1988 |
| JP | H03-008246 U | 1/1991 |
| JP | 2006-198985 A | 8/2006 |
| JP | 2010-100767 A | 5/2010 |
| JP | 2013-075441 A | 4/2013 |

OTHER PUBLICATIONS

Machine Translation of JP 2006-198985 (A). (Year: 2006).*
International Search Report for International Application No. PCT/JP2016/078646 dated Nov. 29, 2016 (4 Sheets).

* cited by examiner

*Primary Examiner* — Brian Handville
(74) *Attorney, Agent, or Firm* — Kratz, Quintos & Hanson, LLP

(57) ABSTRACT

An anti-slip structure comprising a plurality of anti-slip projections that protrude outwardly from a floor surface and are arranged so as to be mutually isolated, the anti-slip structure being such that the anti-slip projections are of circular dome-like three-dimensional shape and are cured bodies produced by curing a composition for anti-slip treatment comprising a curable resin. This anti-slip structure causes a floor surface comprising ceramic tile, tile made of stone material, or the like to be imparted with excellent anti-slip capability without impairing the lustrousness, beauty, design characteristics, or cleanability of the floor surface.

10 Claims, No Drawings

ANTI-SLIP STRUCTURE AND COMPOSITION FOR ANTI-SLIP TREATMENT

TECHNICAL FIELD

The present invention relates to an anti-slip structure for a floor surface or the like and to a composition for an anti-slip treatment for use in forming an anti-slip structure.

BACKGROUND ART

Ceramic tile, marble, granite, and other such stone materials are, in general, widely employed as flooring materials in various commercial facilities, small shops, medical facilities, lodging facilities, public facilities, housing complexes, individual residences, and other such buildings because of their luster, the sense of quality that they convey, and their maintenance-free nature. However, there has been the problem that because the surfaces of these flooring materials are smooth, they tend to be slippery, this being all the more true when water adheres to the floor surface or to the bottom of the shoes due to wet weather, mopping, or the like, causing reduced pedestrian safety. While non-slip grooves have, for example, been formed in the floor surface to improve pedestrian safety, it is sometimes the case that this impairs what would otherwise have been a beautiful external appearance or design of the floor surface.

Patent Reference No. 1 discloses a non-slip flooring material having an anti-slip structure and comprising a substrate, a plurality of projections of thickness 0.1 mm to 1 mm comprising cross-linked resin formed on the substrate, and particulate bodies of particle diameter 0.1 mm to 1 mm dispersed throughout the respective projections and at least partially exposed at the surface of the projections. The substrate is hardboard, slate slab, synthetic resin sheeting, or the like. The cross-linked resin is cross-linking polyvinyl chloride resin, cross-linking acrylic resin, cross-linking urethane resin, epoxy resin, or the like. The particulate bodies comprise silicon carbide, aluminum oxide, or other such inorganic materials; or hard polyvinyl chloride resin, polyurethane, or other such synthetic resin materials.

Patent Reference No. 2 discloses a coating composition in which a resinous solid of an acrylic silicone resin having an alkoxysilyl group contains acrylic resin microbeads of average particle diameter on the order of 80 µm to 150 µm in an amount that is 5 wt % to 15 wt % thereof; and an anti-slip structure in which said coating composition has been applied to and cured on a floor surface comprising ceramic tile.

Patent Reference No. 3 discloses a laminated body for a floor surface having an outermost layer containing resinous beads comprising urethane resin, olefinic resin, or the like, and comprising acrylic resin having a cross-linked structure; and an anti-slip structure in which said laminated body has been made to adhere to a surface of a flooring material comprising stone material or the like. Cited as examples of the acrylic resin having a cross-linked structure of which the matrix resin of said laminated body may be formed are acrylic resins that have been cross-linked and cured through use of isocyanate curing agents, acrylic resins that have been cross-linked and cured through irradiation by ultraviolet light or electron beams, and so forth.

PRIOR ART REFERENCES

Patent References

Patent Reference No. 1: Japanese Utility Model Application Publication Kokai No. H3[1991]-8246

Patent Reference No. 2: Japanese Patent Application Publication Kokai No. 2010-100767

Patent Reference No. 3: Japanese Patent Application Publication Kokai No. 2013-75441

SUMMARY OF INVENTION

Problem to be Solved by Invention

The conventional anti-slip structures disclosed at Patent Reference Nos. 1 through 3 are each such that a composition for an anti-slip treatment comprising a resin matrix and resinous beads dispersed throughout said resin matrix is used to cause a cured film or projections in which at least a portion of the resinous beads are exposed at the surface to form a floor surface that is imparted with anti-slip capability.

However, when the foregoing conventional anti-slip structures are, for example, applied to the surface of ceramic tile, tile comprising stone material, or the like, there is a problem in that such tile is made to have reduced luster and the beautiful external appearance and design characteristics thereof are impaired. Furthermore, because fine dust, debris, and so forth become trapped in the spaces between the resin matrix and resinous beads, there is a problem in that such dirt tends not to be easily cleaned off therefrom. Furthermore, because the resinous beads protrude from the surface, there is a problem in that this impedes use of mops and other such cleaning accouterments, and cleanability is reduced.

Furthermore, because the cured film or projections comprising resin matrix are formed so as to be of comparatively small thickness so as to preserve the beauty, design characteristics, and the like of the tile, this causes the force with which the resinous beads are held thereto to become weak. As a result, it is sometimes the case that abrasion from the bottoms of shoes, cleaning accoutrements, or the like causes the resinous beads to become detached from the cured film or projections, causing anti-slip capability to decrease with time. As microscopic debris and dust which is not easily dislodged therefrom can become trapped in the spaces left by the detached resinous beads, and as the detached resinous beads accumulate on the floor in entangled fashion together with debris, dust, sand, and so forth, this may cause the floor surface to become dirty. Moreover, where there is inadequate dispersion of the resinous beads throughout the resin matrix, it is sometimes the case that a more or less uniform anti-slip capability cannot be obtained.

Furthermore, where, as at the anti-slip structure in Patent Reference No. 1, a plurality of mutually isolated projections are provided at a floor surface, this will allow the floor surface to be imparted with comparatively good anti-slip capability. However, it was found as a result of research by the present inventor(s) that the reason for the deficiency whereby resistance to soiling is poor is the fact that the shape of said projections is such that the apical face and side face(s) thereof are roughly perpendicular, giving them an edge-like profile. For this reason, dirt from the bottoms of shoes, fibrous debris, dust, and so forth adhere to said projections, soiling thereof becoming darker and more conspicuous with time, impairing the beauty (particularly the luster) and design characteristics of the floor surface.

It is an object of the present invention to provide an anti-slip structure permitting a floor surface to be imparted with excellent anti-slip capability for a long period of time without impairing the external appearance or design characteristics, or the cleanability, of the floor surface, and a composition for an anti-slip treatment suitable for forming said anti-slip structure.

Means for Solving Problem

The present inventor(s) engaged in intensive research to solve the foregoing problems. As a result, the present inventor(s) discovered a particular combination in which, in the context of an anti-slip structure comprising a plurality of anti-slip projections that protrude outwardly from a floor surface and that are arranged so as to be mutually isolated, cured bodies produced by curing a composition for anti-slip treatment comprising a curable resin having a comparatively fast curing rate are used as anti-slip projections, and the three-dimensional shape of said anti-slip projections is made to be dome-like. In addition, the present inventor(s) discovered that this particular combination 1) makes it possible to obtain a cured body (anti-slip projection) having high wear resistance and hardness, for which adhesion with respect to a floor surface (particularly tile comprising stone material or ceramic tile) is markedly excellent; and 2) as a result of causing a plurality of anti-slip projections comprising said cured body or bodies to be formed on a floor surface, makes it possible to obtain an anti-slip structure that excels in resistance to soiling and endurance, and has excellent anti-slip capability, without impairing the beauty, design characteristics, or cleanability of the floor surface. Moreover, the present inventor(s) discovered a composition for anti-slip treatment that may be favorably used to form said anti-slip structure. The present inventor(s) arrived at the perfection of present invention based on such knowledge.

The present invention provides an anti-slip structure(s) as at (1) through (8), and composition(s) for anti-slip treatment as at (9) through (15), as follows.

(1) An anti-slip structure comprising a plurality of anti-slip projections that protrude outwardly from a floor surface and are arranged so as to be mutually isolated, the anti-slip structure being such that the anti-slip projections are of dome-like three-dimensional shape and are cured bodies produced by curing a composition for anti-slip treatment comprising a curable resin.

(2) The anti-slip structure according to the foregoing (1) wherein a maximum diameter (mm) at faces of the anti-slip projections that come in contact with the floor surface divided by a maximum height (mm) thereof from the floor surface (the maximum diameter/the maximum height) is within a range that is 1 to 600.

(3) The anti-slip structure according to the foregoing (1) or (2) wherein maximum diameter at faces of the anti-slip projections that come in contact with the floor surface is within a range that is 0.3 mm to 25 mm, and maximum height thereof from the floor surface is within a range that is 0.03 mm to 2 mm.

(4) The anti-slip structure according to any of the foregoing (1) through (3) wherein contact angle of the anti-slip projections is in a range that is 1° to 80°.

(5) The anti-slip structure according to any of the foregoing (1) through (4) wherein distance between an adjacent pair of the anti-slip projections is in a range that is 1 mm to 50 mm.

(6) The anti-slip structure according to any of the foregoing (1) through (5) wherein viscosity (20° C.) of the composition for anti-slip treatment as measured using a BH-type rotational viscometer (20 rpm) is within a range that is 30 mPa·s to 200,000 mPa·s.

(7) The anti-slip structure according to any of the foregoing (1) through (6) wherein the composition for anti-slip treatment is a curable composition comprising, as the curable resin, at least one species selected from among a group consisting of moisture-curable resin, thermally curable resin, and photocurable resin.

(8) The anti-slip structure according to any of the foregoing (1) through (7) wherein a floor surface layer portion that includes the floor surface is at least one species selected from among a group consisting of ceramic material and stone material.

(9) A composition for anti-slip treatment comprising a curable component and a curing catalyst, the composition for anti-slip treatment being such that the curable component comprises 8 wt % to 92 wt % of cross-linking silyl-group-containing polymer, and 8 wt to 92 wt of alkoxy-group-containing silicone oligomer.

(10) The composition for anti-slip treatment according to the foregoing (9) wherein, for every 100 parts by weight of the curable component, 0.05 part by weight to 20 parts by weight of the curing catalyst is comprised thereby.

(11) The composition for anti-slip treatment according to the foregoing (9) or (10) further comprising at least one silane compound selected from among a group consisting of aminosilane, alkylalkoxysilane, epoxysilane, mercaptosilane, isocyanate silane, and acrylsilane.

(12) The composition for anti-slip treatment according to any of the foregoing (9) through (11) wherein the cross-linking silyl-group-containing polymer has a main chain skeleton selected from among a group consisting of polyoxyalkylene, polyoxyalkylene ether, and (meth)acrylic acid ester-type polymer, and a cross-linking silyl group bonded to at least one species selected from among an end and a side chain of the main chain skeleton; and an average number of the cross-linking silyl-groups per molecule is not less than 0.7 group.

(13) The composition for anti-slip treatment according to any of the foregoing (9) through (12) wherein the cross-linking silyl-group is a group in which 1 to 3 cross-linking groups have been substituted into a silyl group; and the group substituted into the silyl group is at least one species selected from among a group consisting of hydrogen atom, halogen atom, alkoxy group, acyloxy group, ketoximate group, amino group, amide group, acid amide group, aminooxy group, mercapto group, alkenyl group, and alkenyloxy group.

(14) The composition for anti-slip treatment according to any of the foregoing (9) through (13) wherein the alkoxy-group-containing silicone oligomer has an alkoxy group in the form of at least one species selected from among methoxy group and ethoxy group, and an organic substituent group in the form of at least one species selected from among alkyl group having 1 to 4 carbons and phenyl group; and the alkoxy-group-containing silicone oligomer comprises 2 to 40 monomer units of a silane compound having no reactive functional group.

(15) The composition for anti-slip treatment according to any of the foregoing (10) through (14) wherein the curing catalyst is at least one species selected from among organo-tin-type compound and organotitanium-type compound.

Benefit of the Invention

The anti-slip structure of the present invention makes it possible for a floor surface to be imparted with anti-slip capability without impairing the beauty (particularly the luster) or design characteristics or cleanability of the floor surface. Furthermore, because said anti-slip structure is such that anti-slip projections have high hardness and good adhesion with respect to the floor surface, and excel in such aspects of endurance as wear resistance, it makes it possible for excellent anti-slip capability to be manifested therein for a long time. Furthermore, employment of a composition for anti-slip treatment in accordance with the present invention will make it possible to fabricate the anti-slip structure of the present invention with good efficiency.

EMBODIMENTS FOR CARRYING OUT THE INVENTION

Anti-Slip Structure

The anti-slip structure of the present invention comprises a plurality of anti-slip projections. The respective anti-slip projections protrude outwardly from a floor surface, and are arranged in such fashion that each anti-slip projection and the other anti-slip projection(s) that are adjacent thereto are mutually isolated. The anti-slip projection of the present invention has the characteristic that it is a cured body produced by curing a composition for anti-slip treatment comprising curable resin, and the characteristic that the three-dimensional shape thereof is dome-like.

As a result of combination of these two characteristics, it permits a floor surface to be imparted with excellent anti-slip capability—and in particular with an excellent anti-slip capability that is especially effective during wet weather and when the floor surface is wet—without impairing the beauty (particularly the luster), design characteristics, cleanability, and so forth of the floor surface. Causing a floor surface to be provided with the anti-slip projections of the present invention will make it possible to markedly prevent falls that would otherwise occur due to slipping or the like. Furthermore, because the anti-slip projections of the present invention have high hardness, good adhesion with respect to the floor surface, and excel in resistance to soiling as well as such aspects of endurance as wear resistance, they make it possible for the beauty of the floor surface and anti-slip capability to be maintained for a long time. Furthermore, because the anti-slip projections of the present invention are not provided for the purpose of being felt by the soles of the feet, it is possible to make the height thereof from the floor surface be comparatively small. For this reason, the anti-slip projections of the present invention are advantageous in that they are good for pedestrian safety, since they will not cause a person to trip and fall.

While the reason that the anti-slip projections of the present invention provide such excellent benefits as have been described above is not adequately understood at the present time, one factor contributing thereto is thought to be that the fact that a cured body produced by curing a composition for anti-slip treatment comprising curable resin is made to be dome-like in shape may permit suppression of wear and detachment from the floor surface, so that despite contact of the anti-slip projections with water the prescribed friction characteristics of the anti-slip projections are maintained, and adherence of dirt thereto is moreover reduced.

The anti-slip projections of the present invention are of dome-like shape such that they protrude outwardly from the floor surface, being provided in such fashion that the bases thereof adhere to the floor surface in such a state as to come in contact therewith, and in such fashion that the surfaces thereof that do not come in contact with the floor surface (hereinafter sometimes referred to as "top surfaces") are directed toward the region thereabove. With respect to what is meant by dome-like shape, while there is no particular limitation with respect thereto so long as the central region thereof protrudes to a location higher than the peripheral region thereabout and the surface thereof is constituted in such fashion as to include a curved surface, it is preferred that this be a circular dome-like shape.

What is meant by circular dome-like shape is a shape which is circular as viewed from above, and which is such that the top face (surface) thereof is made up only of curved surface(s) or is made up of curved surface(s) together with a planar apex, there being no ridges or other such linear zones or recessed zones. Among such circular dome-like shapes, a circular dome-like shape which is such that the locus of the point at which and/or the locus of the vicinity within which the axis (imaginary line) in the direction of protrusion of the anti-slip projection intersects that top face (surface) thereof which is made up only of curved surface(s) or is made up of curved surface(s) and a planar apex is the highest point therealong as measured from the floor surface, is preferred. Furthermore, with respect to what is meant by a circular dome-like shape that is circular as viewed from above, this is not limited to shapes that are perfectly circular, it being possible for this to deviate from roundness so as to be less than perfectly circular and/or so as to be elliptical, oval, and so forth. As the circular dome-like shape, hemispheric, spindle-shaped, in the shape of a half-egg produced by splitting an egg along its long direction, a shape as at any of the foregoing shapes but in which there is a planar apex, and so forth may be cited as specific examples.

Note that where the three-dimensional shape of the anti-slip projection is such that it constituted so as to be in the shape of a square prism, prism, cylinder, or truncated cone, while some anti-slip capability may be achieved, there will be marked reduction in resistance to soiling as time goes on. That is, anti-slip projections in the shape of square prisms, prisms, cylinders, and truncated cones have the defect that, regardless of the material employed therefor, there is a tendency for dirt and dust from the surrounding area to adhere thereto, and there is a tendency for the darkening that occurs to grow more conspicuous with time, impairing the luster and the beauty of the floor surface. Moreover, with anti-slip projections having such three-dimensional shapes, there may be cases in which use of mops and other such cleaning accouterments is impeded, persons may be made to trip and fall, and cleanability and pedestrian safety may be reduced.

At the anti-slip projection of the present invention, there is no particular limitation with respect to the maximum diameter of the face thereof that comes in contact with the floor surface (mm; hereinafter sometimes referred to simply as "maximum diameter"), or the maximum height thereof above the floor surface (mm; hereinafter sometimes referred to simply as "maximum height"), it being possible to choose these as appropriate. However, considering the need to balance such factors as maintaining the beauty (particularly the luster) of the floor surface, design characteristics, cleanability, and so forth, and adhesion between the anti-slip projections and the floor surface, improvement of anti-slip capability, and so forth, it is preferred that the maximum diameter of the anti-slip projection be 0.3 mm to 25 mm, more preferred that this be 0.3 mm to 22 mm, still more preferred that this be 1 mm to 10 mm, and especially preferred that this be 1 mm to 5 mm. Furthermore, considering anti-slip capability, cleanability, pedestrian safety (especially prevention of trips and falls), and so forth, it is preferred that maximum height of the anti-slip projection be 0.03 mm to 2 mm; more preferred that this be 0.05 mm to 2 mm, and still more preferred that this be 0.05 mm to 1 mm.

Furthermore, at the anti-slip projection of the present invention, while there is no particular limitation with respect to the aspect ratio which is the maximum diameter divided by the maximum height (maximum diameter/maximum height), from the standpoint of causing the contact angle of the anti-slip projection to be comparatively small while causing anti-slip capability to be adequately manifested therein, it is preferred that this be 1 to 600, more preferred that this be 1 to 400, still more preferred that this be 5 to 150, and especially preferred that this be 5 to 60. If the aspect ratio is less than 1 or is greater than 600, there is a possibility that the type of composition for anti-slip treatment, the type of flooring material, or the like could, for example, have an effect on anti-slip capability, adhesion of the anti-slip projection with respect to the floor surface, and/or the like. Furthermore, when the aspect ratio is less than 1, this may cause adhesion with respect to the floor to decrease. The anti-slip projection of the present invention has maximum diameter and maximum height within the foregoing range(s), it being preferred that the aspect ratio thereof be as specified herein.

Furthermore, at the anti-slip projection of the present invention, causing a cured body produced by curing a composition for anti-slip treatment comprising curable resin to be formed so as to be of dome-like shape (preferably circular dome-like shape) may cause the contact angle (surface contact angle) thereof to preferably be 1° to 80°, more preferably be 5° to 60°, still more preferably be 10° to 40°, and especially preferably be 10° to 25°. Causing the contact angle of the anti-slip projection to be within the foregoing range(s) will allow pronounced benefit to be obtained whereby a floor surface may be imparted with anti-slip capability without impairing the beauty (particularly the luster), design characteristics, cleanability, and so forth of the floor surface. Note that the contact angle of the anti-slip projection may be adjusted, for example, through adjustment of the aspect ratio of the anti-slip projection, selection of curable resin(s) comprised by the composition for anti-slip treatment that makes up the anti-slip projection, and so forth. The surface contact angle referred to in the present specification is the value determined by clicking on three points in an image processing technique performed using a model CA-X150 device manufactured by Kyowa Interface Science Co., Ltd.

The plurality of anti-slip projections are formed so as to be mutually isolated; more specifically, these are formed in such fashion that any arbitrarily chosen pair of adjacent anti-slip projections will be mutually isolated. While there is no particular limitation with respect to the distance between each such pair of anti-slip projections, from the standpoints of anti-slip capability, cleanability, pedestrian safety, and so forth, it is preferred that this be in a range that is 1 mm to 50 mm. While the plurality of anti-slip projections may be arranged in regular fashion, e.g., in a lattice-like pattern, in a houndstooth pattern, in a concentric pattern, in a radial pattern, or the like, or they may be arranged in irregular fashion, from such standpoints as cleanability and anti-slip capability of the anti-slip structure, it is preferred that these be arranged in regular fashion. Furthermore, it is also possible for the anti-slip projections to collectively represent character(s), symbol(s), design(s), and/or the like.

The anti-slip structure of the present invention may, for example, be favorably employed for forming a floor surface in any of various commercial facilities, small shops, medical facilities, lodging facilities, public facilities, housing complexes, individual residences, and other such buildings; and in particular, for forming a floor surface comprising ceramic tile, tile made of stone material, or the like. More specifically, by, for example, forming the anti-slip structure of the present invention on any of various comparatively slippery respective floor surfaces such as the floor surface of a large-scale commercial facility, store, or the like; the floor surface in the lobby or corridors of a hotel, hospital, or the like; the floor surface within the rooms or at the entrance of a condominium; and so forth, it will be possible to markedly improve anti-slip capability and pedestrian safety without impairing the lustrousness, beauty, design characteristics, cleanability, and so forth of the floor surface.

As described above, the anti-slip projection of the present invention is a cured body produced by curing a composition for anti-slip treatment comprising curable resin. That is, the composition for anti-slip treatment is a curable composition comprising curable resin. While there is no particular limitation with respect to the curable resin, based upon considerations such as adjustment of the contact angle of the anti-slip projection so as to be within the foregoing prescribed range(s), it is preferred that this be at least one species selected from among the group consisting of moisture-curable resin, thermally curable resin, and photocurable resin. Note that it is preferred that the composition for anti-slip treatment be a curable composition which is liquid at normal temperature and which is cured by moisture, heat, irradiation by light, and/or the like; and it is more preferred that this be a curable composition which is liquid at normal temperature and which is cured by moisture, irradiation by light, and/or the like. As the curable liquid composition, a curable resin that is itself liquid, a solution of a curable resin in organic solvent, and so forth may be cited as examples. There is no particular limitation with respect to the organic solvent in which the composition for anti-slip treatment is dissolved, it being possible to choose this appropriately from known organic solvents in correspondence to the type of the composition for anti-slip treatment.

As moisture-curable resin, while there is no particular limitation with respect thereto, it being possible to use any known substance, a modified silicone resin that cures as a result of moisture may for example be favorably employed. As modified silicone resin, a composition for anti-slip treatment that comprises a curable component that cures as a result of moisture, the curable component comprising 8 wt % to 92 wt % of cross-linking silyl-group-containing polymer (hereinafter sometimes referred to as "curable polymer component") and comprising 8 wt % to 92 wt % of alkoxy-group-containing silicone oligomer (hereinafter sometimes referred to as "curable oligomer component"), and optionally also comprising at least one arbitrary component chosen from among additives for resin, curing catalysts, and silane compounds other than cross-linking silyl-group-containing polymers and alkoxy-group-containing silicone oligomers, may be cited as examples. Below, in describing the essential component(s) and optional component(s) thereof in further detail, the composition for anti-slip treatment comprising the foregoing modified silicone resin as curable resin will be referred to as curable composition (X).

With respect to the curable polymer component, while there is no particular limitation with respect thereto so long as it is a polymer having cross-linking silyl-group(s), it preferred that this be a curable polymer component (A) having a main chain skeleton selected from among the group consisting of polyoxyalkylene, polyoxyalkylene ether, and (meth)acrylic acid ester-type polymers, and cross-linking silyl group(s) bonded to end(s) and/or side chain(s) of the main chain skeleton (more preferably to end(s) of the main chain skeleton); and based upon consideration of such aspects of endurance as wear resistance, hardness, and adhesion with respect to flooring materials of the cured body produced by curing of curable composition (X), it is more preferred that the curable polymer component (A) be a substance for which the average number of cross-linking silyl-group(s) per molecule is not less than 0.7 group; still more preferred that this be 0.7 group to 3.0 groups; and especially preferred that this be 1.2 groups to 2.6 groups.

What is referred to here as cross-linking silyl group which is present within the curable polymer component is a silyl group having a cross-linking group which forms a cross-linked bond as a result of hydrolysis or the like; more specifically, this is a group that is a silyl group in which 1 to 3 cross-linking group(s) have been substituted. As group(s) substituted into the silyl group(s), at least one species selected from among the group consisting of hydrogen atom, halogen atom, alkoxy group, acyloxy group, ketoximate group, amino group, amide group, acid amide group, aminooxy group, mercapto group, alkenyl group, and alkenyloxy group may be cited as examples. Among these groups which may be substituted into the silyl group, alkoxy groups are preferred as cross-linking group(s), and straight-chain alkoxy groups having 1 to 4 carbons are more preferred. In accordance with the present invention, the cross-linking silyl group(s) may have two or more different cross-linking groups.

It is preferred that the number average molecular weight of the curable polymer component be not less than 500, more preferred that this be not less than 1000, still more preferred that this be 1000 to 100000, and especially preferred that this be 1000 to 60000. When the number average molecular weight is less than 500, there is a tendency for there to be a worsening of the properties of the cured substance produced by curing of curable composition (X). On the other hand, while there is no particular limitation with respect to the upper limit of the range in values for the number average molecular weight, based upon considerations such as ease of operations when preparing curable composition (X) or when causing the anti-slip structure to be formed on the floor surface, it is preferred that the number average molecular weight be not greater than 100000, and more preferred that this be not greater than 60000.

At a curable polymer component (A1) in which the main chain skeleton is polyoxyalkylene, polyoxyethylene, polyoxypropylene, polyoxybutylene, and other such polyoxyalkylenes for which the number of carbons of the alkylene unit is 2 to 6, or preferably 2 to 4, may be cited as examples of the polyoxyalkylene; and among these, polyoxypropylene is preferred. Furthermore, at a curable polymer component (A2) in which the main chain skeleton is polyalkylene ether, ethers which are the reaction products of a polyoxyalkylene and an alcohol in the presence of an alkaline catalyst may be cited as examples of the polyoxyalkylene ether; among these, ethers and the like produced by reaction of polyoxyalkylene and a saturated or unsaturated alcohol having 4 to 22 carbons are preferred, and ethers produced by reaction of a polyoxyalkylene for which the number of carbons of the alkylene portion is 2 to 6, or preferably 2 to 4, and a saturated alcohol having 1 to 6 carbons, or preferably 2 to 4 carbons, are more preferred.

Commercially available products may be used as the curable polymer component (A1) in which the main chain skeleton is polyoxyalkylene and as the curable polymer component (A2) in which the main chain skeleton is polyoxyalkylene ether. As said commercially available products, Kaneka MS Polymer (trademark) S810, Kaneka MS Polymer S-203, Silyl (trademark) SAT-115, Silyl SAT-145, Silyl SAX510, Silyl SAX520, Silyl SAX530, Silyl SAX580 (all product names and manufactured by Kaneka Corporation); Excestar (registered trademark) S2410, Excestar W2521, Excestar A2551 (all product names and manufactured by Asahi Glass Co., Ltd.); and so forth may be cited as examples. It is preferred that the number average molecular weight of the curable polymer component (A) in which the main chain skeleton is polyoxyalkylene or polyoxyalkylene ether be 1000 to 60000, and more preferred that this be 1000 to 25000.

The curable polymer component (A3) in which the main chain skeleton is a (meth)acrylic acid ester-type polymer might, for example, be manufactured by polymerizing (meth)acrylic acid alkylester with a silane compound selected from vinyl alkoxysilane and (meth)acryloxyalkoxysilane in the presence of mercaptoalkoxysilane as chain transfer agent. As the polymerization method, known methods such as redox polymerization, solution polymerization or bulk polymerization using a radical polymerization catalyst, and so forth may be cited as examples. As a result hereof, a (meth)acrylic acid ester-type polymer can be obtained for which the average number of cross-linking silyl groups per molecule is 1.2 to 3 groups. This manufacturing method is described, for example, at Japanese Patent Application Publication Kokoku No. H03 [1991]-80829.

As (meth)acrylic acid alkylesters which may be used in the foregoing manufacturing method, ethyl (meth)acrylate, propyl (meth)acrylate, n-butyl (meth)acrylate, isobutyl (meth)acrylate, amyl (meth)acrylate, hexyl (meth)acrylate, 2-ethylhexyl (meth)acrylate, cyclohexyl (meth)acrylate, n-octyl (meth)acrylate, and other such (meth)acrylic acid alkylesters in which the alkyl portion is a straight-chain or cyclic moiety having 2 to 4 carbons may be cited as examples.

As vinyl alkoxysilanes which may be used in the foregoing manufacturing method, vinyltrimethoxysilane, vinylmethyldimethoxysilane, vinyltriethoxysilane, vinyl dimethylmethoxysilane, and other such vinyl alkoxysilanes in which the alkoxy portion is an alkoxy chain having 1 to 4 carbons may be cited as examples. As (meth)acryloxyalkoxysilanes, γ-methacryloxypropyltrimethoxysilane, γ-methacryloxypropylmethyldimethoxysilane, and other such (meth)acryloxyalkoxysilanes in which the alkoxy portion is an alkoxy chain having 1 to 4 carbons may be cited as examples. As mercaptoalkoxysilanes, γ-mercaptopropylmethyldimethoxysilane, γ-mercaptopropyltrimethoxysilane, and other such mercaptoalkoxysilanes in which the alkoxy portion is an alkoxy chain having 1 to 4 carbons may be cited as examples.

Furthermore, the curable polymer component (A3) in which the main chain skeleton is a (meth)acrylic acid ester-type polymer may also be manufactured by photopolymerizing (irradiation by light for 4 hr to 30 hr at normal temperature to 50° to 60° C.) a monomer compound selected from (meth)acrylic acid ester-type compounds and vinyl compounds, and a cross-linking silyl-group-containing disulfide compound, this being carried out in an organic solvent (toluene, xylene, hexane, ethyl acetate, dioctyl phthalate, etc.) where necessary. This manufacturing method is described, for example, at Japanese Patent Application Publication Kokoku No. H04[1992]-69667.

As (meth)acrylic acid ester-type compounds which may be used in the foregoing manufacturing method, the aforementioned (meth)acrylic acid alkylesters in which the alkyl portion is a straight-chain or cyclic moiety having 2 to 4 carbons may be cited as examples. As vinyl compounds, styrene, α-methylstyrene, chloromethyl styrene, and other such styrenic compounds may be cited as examples. As cross-linking silyl-group-containing disulfide compounds, bis(trimethoxysilylmethyl)disulfide, bis(triethoxysilylmethyl)disulfide, bis(trimethoxysilylpropyl)disulfide, bis(triethoxysilylpropyl)disulfide, bis(methyldimethoxysilylmethyl)disulfide, bis(methyldiethoxysilylmethyl)disulfide, bis(propyldimethoxysilylmethyl)disulfide, bis(propyldiethoxysilylmethyl)disulfide, bis(dimethylmethoxysilylpropyl)disulfide, bis(dimethylethoxysilylpropyl)disulfide, and so forth may be cited as examples.

Commercially available products may be used as the curable polymer component (A3) in which the main chain skeleton is an acrylic acid ester-type polymer; as said commercially available products, Silyl MA-480 (product name; manufactured by Kaneka Corporation), Arufon (trademark) US-6110 (product name; acrylic polymer having alkoxysilyl group(s); average number of alkoxysilyl groups per molecule=0.9 group; number average molecular weight=3000; manufactured by Toagosei Co., Ltd.), and so forth may be cited as examples.

Furthermore, at curable composition (X), as curable polymer component (A), at least one species selected from among the group consisting of curable polymer component (A1), curable polymer component (A2), and curable polymer component (A3) may be cited as examples. Thereamong, based upon consideration of such aspects of endurance as wear resistance, hardness, and adhesion with respect to the floor surface of curable composition (X), curable polymer component (A1), curable polymer component (A3), a mixture of curable polymer component (A1) and curable polymer component (A3), and so forth are preferred.

At curable composition (X), as the curable oligomer component, there being no particular limitation with respect thereto so long as it is an oligomer of a silane compound having an alkoxy group, curable oligomer components (B) represented by General Formula (1) may be cited as examples.

[—Si(OR$^1$)(R$^2$)—O—]m    (1)

(At the Formula, R$^1$ indicates an alkyl group; R$^2$ indicates an alkyl group, an aryl group, or a reactive functional group; m indicates an integer from 2 to 100 which is the number of repetitions of the monomer unit; note that the m instances of R$^1$ and the m instances of R$^2$ may respectively be the same or different.) At General Formula (1), note that an —OR$^1$ group ordinarily bonds to the end at the silicon atom, and an R$^2$ group ordinarily bonds to the end at the oxygen atom. Furthermore, note that the alkoxy group may also be referred to as an alkoxysilyl group by virtue of the silicon atom to which it is bonded.

At General Formula (1), as alkyl group indicated by R$^1$ or R$^2$, methyl group, ethyl group, n-propyl group, isopropyl group, n-butyl group, sec-butyl group, isobutyl group, tert-butyl group, n-pentyl group, n-hexyl group, and other such straight-chain or branched-chain alkyl groups having 1 to 6 carbons may be cited as examples; thereamong, straight-chain or branched-chain alkyl groups having 1 to 4 carbons are preferred, straight-chain alkyl groups having 1 to 4 carbons are more preferred, and methyl group is still more preferred. As aryl groups indicated by R$^2$, phenyl group, 1-naphthyl group, 2-naphthyl group, p-tolyl group, and other such aryl groups having 6 to 10 carbon may be cited as examples; thereamong, phenyl group is preferred. As reactive functional group indicated by R$^2$, epoxy group, mercapto group, (meth)acryl group, vinyl group, and so forth may be cited as examples.

Among curable oligomer components (B), at General Formula (1), it is preferred that this be an oligomer in which the m instances of R$^1$ are methyl group(s) or ethyl group(s), the m instances of R$^2$ are straight-chain alkyl group(s) having 1 to 4 carbons and/or aryl group(s) having 6 to 10 carbons, there is no reactive functional group, and m is an integer from 2 to 40; it is more preferred that this be an oligomer in which the m instances of R$^1$ are methyl group(s) or ethyl group(s), the m instances of R$^2$ are straight-chain alkyl group(s) having 1 to 4 carbons and/or phenyl group(s), there is no reactive functional group, and m is an integer from 2 to 40; and it is still more preferred that this be an oligomer in which the m instances of R$^1$ are all methyl groups, the m instances of R$^2$ comprise methyl group(s) and phenyl group(s), there is no reactive functional group, and m is an integer from 2 to 40 (it is especially preferred that m be an integer from 1 to 15). Curable oligomer component (B) may be a mixture of a plurality of curable oligomer components (B) for which m, which indicates the number of repetitions of the monomer unit, are different.

As such curable oligomer component(s) (B), commercially available product(s) may be used. As said commercially available products, while there are many substances commercially available from many companies, taking the example of those commercially available products which are manufactured by Shin-Etsu Chemical Co., Ltd., product names KR-511, KR-513, KR-516, KR-517, and other such curable oligomer components having reactive functional group(s); product names KR-213, KR-401N, KR -500, KR-510, KR-515, KR-9218, KC-89S, X-40-9225, X-40-9227, X-40-9246, X-40-9250, and other such curable oligomer components having no reactive functional group; and so forth may be cited as examples.

Commercially available curable oligomer components having no reactive functional group might, for example, have methyl group(s) or methyl group(s) and phenyl group(s) together with methoxy group(s) as substituent group(s), and might be such that viscosity (25° C.) is within the range 5 mm$^2$/s to 160 mm$^2$/s (preferably 20 mm$^2$/s to 100 mm$^2$/s), refractive index (25° C.) is within the range 1.35 to 1.55 (preferably 1.39 to 1.54), and methoxy group content is within the range 10 wt % to 50 wt % (preferably 15 wt % to 35 wt %).

Any of the curable oligomer components may be used alone, or two or more species chosen from thereamong may be used in combination. Two or more species chosen from among commercially available products may of course be mixed together and used.

Regarding the curable components, there being no particular limitation with respect to the ratio with which the curable polymer component and curable oligomer component are used, and although these may, for example, be chosen appropriately in correspondence to various conditions such as the material of the floor surface on which the cured body produced by curing curable composition (X) is to be formed, the shape and dimensions of the cured body, and the properties designed for the cured body, expressed as percentages of total amount of all curable components, it is preferred that the curable polymer component be present in an amount that is 8 wt % to 92 wt % and that the curable oligomer component be present in an amount that is 8 wt % to 92 wt %, more preferred that the curable polymer component be present in an amount that is 15 wt % to 85 wt % and that the curable oligomer component be present in an amount that is 15 wt % to 85 wt %, and still more preferred that the curable polymer component be present in an amount that is 35 wt % to 65 wt % and that the curable oligomer component be present in an amount that is 35 wt % to 65 wt %.

Causing respective contents of the curable components comprising the curable polymer component and the curable oligomer component to be within the foregoing ranges will make such excellent characteristics as the following manifest in the cured body produced by curing curable composition (X). That is, it will be possible to obtain an anti-slip structure comprising a plurality of anti-slip projections, described below, in which such aspects of endurance as retention of luster, wear resistance, hardness, and adhesion with respect to a floor surface are respectively made to reach high levels. Furthermore, said anti-slip structure will permit excellent anti-slip capability to be manifested therein not only during fair weather and at other such times when it is dry but also during wet weather or when water has been used to perform cleaning operations, making it possible to improve pedestrian safety of flooring materials, particularly flooring materials comprising stone material or ceramic tile.

If the content of the curable polymer component is less than 8 wt % or the content of the curable oligomer component is greater than 92 wt %, there is a tendency for the hardness of the cured body produced by curing of curable composition (X) to increase, and there is a possibility that such aspects of endurance as the wear resistance of the cured body will be reduced. On the other hand, if the content of the curable polymer component is greater than 92 wt % or the content of the curable oligomer component is less than 8 wt %, there is a tendency for the viscosity of the pre-curing curable composition (X) to increase and for handling characteristics to worsen. As a result, there is a possibility that such characteristics as ease of operations when using curable composition (X) to form the anti-slip structure on the floor surface will decrease.

At curable composition (X), the curing catalyst that may be used together with the curable component may also be referred to as a silanol condensation catalyst; as such curing catalyst, it being possible to employ any curing catalyst customarily used in this field, organotin-type compounds, organotitanium-type compounds, and other such metallic catalysts, metallic catalysts in which the metal is other than tin or titanium, and so forth may be cited as examples. As organotin-type compound, while there is no particular limitation with respect thereto, tin octylate, tin oleate, tin stearate, tin dioctylate, tin distearate, tin dinaphthenate, and other such tin carboxylates; dibutyltin dilaurate, dibutyltin bis (alkyl maleate), and other such dibutyltin dicarboxylates; dibutyltin dimethoxide, dibutyltin diphenoxide, and other such dialkyltin alkoxide derivatives; dibutyltin diacetylacetonate, dibutyltin acetoacetate, dibutyltin diethyl hexanoate, dibutyltin dioctoate, dibutyltin oxide, dibutyltin bis ethoxy silicate, dioctyl tin oxide, and other such intramolecularly coordinated dialkyltin derivatives; reaction mixtures of dibutyltin oxides and ester compounds, reaction mixtures of dibutyltin oxides and silicate compounds; oxy derivatives of any of these dialkyltin oxide derivatives, and other such tetravalent dialkyltin oxide derivatives; and so forth may be cited as examples. As organotitanium-type compound, tetra-n-butoxy titanate, tetraisopropoxotitanate, and so forth may be cited as examples. Furthermore, as metallic catalyst in which the metal is other than tin or titanium, calcium carboxylates, zirconium carboxylates, iron carboxylates, vanadium carboxylates, bismuth carboxylates, lead carboxylates, titanium carboxylates, nickel carboxylates, and other such metal carboxylates in which the carboxylic acid component is octyl acid, oleic acid, naphthenic acid, stearic acid, or the like may be cited as examples. Among these, metallic catalysts are preferred, organotin-type compounds and organotitanium-type compounds are more preferred, and organotin-type compounds are still more preferred. Any one curing catalyst may be used alone, or two or more curing catalysts may be used in combination.

While there is no particular limitation with respect to the content of the curing catalyst within curable composition (X), for every 100 parts by weight of the curable component it is preferred that this be 0.05 part by weight to 20 parts by weight, more preferred that this be 0.1 part by weight to 10 parts by weight, and still more preferred that this be 0.3 part by weight to 10 parts by weight. When content of the curing catalyst is less than 0.05 part by weight, there is a tendency for there to be reduction in the curability of curable composition (X), and in such aspects of endurance as wear resistance, hardness, and so forth of the cured body produced by curing of curable composition (X). When content of the curing catalyst is greater than 20 parts by weight, there is a tendency for curing rate to become too high and for viscosity of curable composition (X) to increase, causing handling characteristics to worsen, and reducing ease of operations when causing the anti-slip structure to be formed on the floor surface. Moreover, there is increased contraction due to curing and reduced adhesion with respect to the floor surface.

As described above, within ranges for which the properties of the cured body produced by curing thereof do not worsen, curable composition (X) may comprise silane compounds other than cross-linking silyl-group-containing polymers and alkoxy-group-containing silicone oligomers. As said silane compound, silane compounds having reactive functional groups may be cited as examples. As specific examples of silane compounds having reactive functional groups, aminosilanes, alkylalkoxysilanes, epoxysilanes, mercaptosilanes, isocyanate silanes, acrylsilanes, and so forth may be cited, it being possible to use any one of these silane compounds alone, or to use two or more chosen from thereamong in combination. From the standpoint of improving curing rate of curable composition (X), or of achieving further improvement in the properties of the cured body produced by curing same, among these silane compounds, aminosilanes may be favorably used.

What is referred to as an aminosilane refers generally to a silane compound in which there is at least one amino group within the molecule; N-2-(aminoethyl)-3-aminopropylmethyldimethoxysilane, N-2-(aminoethyl) -3-aminopropylmethyldiethoxysilane, N-2-(aminoethyl)-3-aminopropyldimethoxysilane, N-2-(aminoethyl)-3-aminopropyldiethoxysilane, N-2-(aminoethyl)-3-aminopropyltrimethoxysilane, N-2-(aminoethyl)-3-aminopropyltriethoxysilane, 3-aminopropyldimethylmethoxysilane, 3-aminopropylmethyldimethoxysilane, 3-aminopropylmethyldiethoxysilane, 3-aminopropyltrimethoxysilane, 3-aminopropyltriethoxysilane, 3-methyldimethoxysilyl-N -(1,3-dimethyl-butylidene) propylamine, 3-methyl-diethoxysilyl-N-(1,3-dimethyl-butylidene propylamine, 3-trimethoxysilyl-N-(1,3-dimethyl-butylidene)propylamine, 3-triethoxysilyl-N-(1,3-dimethyl-butylidene)propylamine, N-phenyl-3-aminopropylmethyldiethoxysilane, N-phenyl -3-aminopropylmethyldiethoxysilane, N-phenyl-3-aminopropyltrimethoxysilane, N-phenyl-3-aminopropyltriethoxysilane, N-(vinylbenzyl) -2-aminoethyl-3-aminopropyltrimethoxysilane, and so forth may be cited as examples. Any one aminosilane may be used alone, or two or more aminosilanes may be used in combination.

What is referred to as an alkylalkoxysilane refers generally to a silane compound in which there is one or a plurality of alkyl group(s) and alkoxy group(s) within the molecule; methyltrimethoxysilane, dimethyldimethoxysilane, phenyltrimethoxysilane, methyltriethoxysilane dimethyldiethylsilane, phenyltriethoxysilane, n-propyltrimethoxysilane, n-propyltriethoxysilane, hexyltrimethoxysilane, hexyltriethoxysilane, octyltriethoxysilane, decyltrimethoxysilane, trifluoropropyltrimethoxysilane, and so forth may be cited as examples. Any one alkylalkoxysilane may be used alone, or two or more alkylalkoxysilanes may be used in combination.

What is referred to as an epoxysilane refers generally to a silane compound in which there is at least one epoxy group within the molecule; 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, and so forth may be cited as examples. Any one epoxysilane may be used alone, or two or more epoxysilanes may be used in combination.

What is referred to as a mercaptosilane refers generally to a silane compound in which there is at least one mercapto group within the molecule; γ-mercaptopropyltrimethoxysilane, γ-mercaptopropyltriethoxysilane, γ-mercaptopropylmethyldimethoxysilane, γ-mercaptopropyldimethylmethoxysilane, γ-mercaptopropylmethyldiethoxysilane, γ-mercaptopropyldimethylethoxysilane, and so forth may be cited as examples. It being possible to use commercially available products as the mercaptosilane, KBM803 (product name; manufactured by Shin-Etsu Chemical Co., Ltd.), Z-6062 (product name; manufactured by Dow Corning Toray Co., Ltd.), Z-6911 (product name, manufactured by Dow Corning Toray Co., Ltd.), M8450 (product name; manufactured by Chisso Corporation), and so forth may be cited as examples. Any one mercaptosilane may be used alone, or two or more mercaptosilanes may be used in combination.

What is referred to as an isocyanate silane refers generally to a silane compound in which there is at least one isocyanate group within the molecule; 3-isocyanate propyltrimethoxysilane, 3-isocyanate propyltriethoxysilane, 3-isocyanate propylmethyldimethoxysilane, 3-isocyanate propylmethyldiethoxysilane, and so forth may be cited as examples. Any one isocyanate silane may be used alone, or two or more isocyanate silanes may be used in combination.

What is referred to as an acrylsilane refers generally to a silane compound in which there is at least one vinyl group within the molecule; vinyltrichlorosilane, vinyltrimethoxysilane, vinyltriethoxysilane, vinyltrichlorosilane, vinyltris (β-methoxyethoxy)silane, vinyltriacetoxysilane, γ-(methacryloxypropyl)trimethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, γ-methacryloxypropyl tris(β-methoxyethoxy)silane, γ-methacryloxypropylmethyldimethoxysilane, N-β-(N-vinylbenzylaminoethyl)-γ-aminopropyltrimethoxysilane hydrochloride, dimethylvinylmethoxysilane, dimethylvinylethoxysilane, methylvinyldimethoxysilane, methylvinyldiethoxysilane, and so forth may be cited as examples. Any one acrylsilane may be used alone, or two or more acrylsilanes may be used in combination.

While there is no particular limitation with respect to the content of silane compound(s) within curable composition (X), for every 100 parts by weight of the curable component it is preferred that this be 0.1 part by weight to 50 parts by weight, more preferred that this be 2 parts by weight to 45 parts by weight, and still more preferred that this be 5 parts by weight to 35 parts by weight.

In the context of a composition for anti-slip treatment (hereinafter sometimes referred to as "curable composition (Y)") which comprises thermally curable resin serving as curable resin, silicone resin, epoxy resin, urethane resin, and so forth may, for example, be favorably used as thermally curable resin. Any one thermally curable resin may be used alone, or two or more thermally curable resins may be used in combination. Note that the thermally curable resin(s) comprised by curable composition (Y) may, depending on the choice of curing agent(s) that may be used in combination therewith, include substances which harden at room temperature without application of heat.

Furthermore, in the context of a composition for anti-slip treatment (hereinafter sometimes referred to as "curable composition (Z)") which comprises photocurable resin serving as curable resin, while any of the various curable resins capable of being cured as a result of irradiation with ultraviolet rays or other such light rays may be used without any particular limitation with respect thereto, photocurable acrylic resin and so forth may, for example, be favorably used as photocurable resin.

As was the case with use of moisture-curable resin, it is possible when using thermally curable resin or photocurable resin to easily adjust the contact angle of the anti-slip projection so as to be within prescribed range(s). As a result, it will be possible to form anti-slip projections which have excellent resistance to soiling, which have excellent anti-slip capability, and for which there is retention of anti-slip capability for a long time, without impairing the beauty, design characteristics, cleanability, and so forth of the floor surface. As such curable resins, employment of those selected from among those which are liquid at normal temperature and which will cure following application to a floor surface is preferred.

The composition for anti-slip treatment which comprises curable composition (X), (Y), (Z), and/or other such curable resin(s) may include ordinary resin additive(s) as optional component(s) within range(s) for which the properties of the cured body produced as a result of curing thereof remain unimpaired. As resin additive, fillers, plasticizers, colorants, organic solvents, antioxidizers, ultraviolet light absorbers, light stabilizers, antioxidants, thixotropic agents, and so forth may be cited as examples, it being possible for any one of these to be used alone, or for two or more of these to be used in combination.

As filler, heavy calcium carbonate, light calcium carbonate, fatty-acid-treated calcium carbonate, colloidal calcium carbonate, fumed silica, precipitated silica, carbon black, magnesium carbonate, diatomaceous earth, isinglass, talc, mica, clay, bentonite, organic bentonite, ferric oxide, zinc oxide, and other such inorganic salts, glass beads, shirasu balloons, glass balloons, silica balloons, plastic balloons, and other such balloons, glass fibers, metal fibers, and other such inorganic fibers, polyethylene fibers, polypropylene fibers, and other such organic fibers, aluminum borate, silicon carbide, silicon nitride, potassium titanate, graphite, acicular crystalline calcium carbonate, magnesium borate, titanium diboride, chrysotile, wollastonite, and other such acicular crystalline fillers, and so forth may be cited as examples.

As plasticizer, phthalic acid diesters (diisononyl phthalate, etc.), epoxidized hexahydrophthalic acid diesters, alkylene dicarboxylic acid diesters, alkylbenzenes, and so forth may be cited as examples.

As colorant, red iron oxide, titanium oxide, carbon black, other colorant pigments, dyes, and so forth may be cited as examples.

As organic solvent, methanol, ethanol, isopropanol, n-butanol, acetone, methyl ethyl ketone, ligroin, ethyl acetate, tetrahydrofuran, n-hexane, heptane, isoparaffin-type high-boiling-point solvents, and so forth may be cited as examples. Note that methanol and ethanol can be used as stabilizer(s).

As antioxidizer, hindered phenols, mercaptans, sulfides, dithiocarboxylic acid salts, thioureas, thiophosphates, thioaldehydes, and so forth may be cited as examples.

As ultraviolet light absorber, benzotriazoles, benzophenones, salicylates, cyanoacrylates, nickel complex salts, and so forth may be cited as examples. As light stabilizer, hindered amines and so forth may be cited as examples.

As antioxidant, hindered phenols and so forth may be cited as examples.

As thixotropic agent, colloidal silica, organic bentonite, fatty acid amides, hydrogenated castor oil, and so forth may be cited as examples.

Any of the respective foregoing additives may be used alone, or two or more species chosen from thereamong may be used in combination.

Curable composition (X) may, for example, be obtained by mixing the foregoing respective essential components (except for curing catalyst) with, where necessary, the foregoing silane compound(s) and/or resin additive(s) (except for colorant), causing the mixture which is obtained to be exposed to a vacuum and degassed, adding curing catalyst(s) and, where necessary, colorant(s) to the degassed mixture, and mixing this further. Similarly with respect to curable compositions (Y) and (Z) comprising, other than the foregoing, thermally curable resin or photocurable resin. This may comprise one resin additive, or it may comprise two or more resin additives.

The pre-curing composition for anti-slip treatment which is thus obtained is ordinarily transparent. Furthermore, where the composition for anti-slip treatment is to be used as material for anti-slip projection(s), it should be used in a form in which it is itself a liquid curable resin or it should be used in a form of a solution of the curable resin in organic solvent. It is preferred that viscosity thereof at 20° C. as measured using a BH-type rotational viscometer (20 rpm) be adjusted so as to be within the range 30 mPa·s to 200,000 mPa·s.

Note that, based upon considerations including ease of operations when forming the anti-slip structure as well as, in the context of a method for manufacturing the anti-slip structure, described below, achievement of a constitution such that the composition for anti-slip treatment, after it has been removed from the masking sheet die and before it has completely cured, more or less maintains a prescribed three-dimensional shape while only a portion thereof deforms (e.g., the region peripheral to the apex deforms so as to be more or less curved and/or arcuate), it is preferred that viscosity (20° C.) be adjusted so as to be within the range 50 mPa·s to 5000 mPa·s. Viscosity of the composition for anti-slip treatment may be adjusted, for example, through selection of the composition for anti-slip treatment itself, selection of type(s) and content(s) of component(s) comprised by the composition for anti-slip treatment, and so forth. Moreover, viscosity may be adjusted by means of optional component(s) and/or resin additive(s).

Next, methods for manufacturing the anti-slip structure of the present invention will be described. The anti-slip structure of the present invention might, for example, be fabricated by a method comprising an operation (A) in which masking sheet, at which a plurality of through-holes are arranged in distributed fashion, is affixed to a floor surface; an operation (B) in which the composition for anti-slip treatment (preferably liquid composition for anti-slip treatment) is used to fill holes formed by the floor surface and the through-holes of the masking sheet, and is made to adhere to the floor surface; an operation (C) in which the masking sheet is removed from the floor, this being performed, where necessary, while applying heat thereto or causing irradiation thereof with light; and an operation (D) in which the composition for anti-slip treatment adhering to locations where the through-holes of the masking sheet were present is cured to form a plurality of anti-slip projections. Below, respective operations (A) through (D) are described in further detail.

In accordance with the present invention, prior to carrying out operation (A), an operation in which the floor surface on which the anti-slip projections are to be formed (hereinafter sometimes referred to as "treatment target surface") is cleaned may be carried out. The cleaning operation may be carried out in similar fashion as in conventional methods; for example, this might be carried out by using a vacuum cleaner or the like to remove debris, sand, dirt, dust, and so forth from the treatment target surface, and thereafter using chemical(s) and tissue wipe(s) to remove grease and other dirt from the treatment target surface. Here, as chemical(s), organic solvents that are comparatively safe for the human body may be used; as said organic solvents, isopropanol and other such lower alcohols, and acetone and other such ketones, may be cited as examples.

At operation (A), masking sheet, at which a plurality of through-holes are arranged in distributed fashion, is affixed to a floor surface. There being no particular limitation with respect to the material(s) from which the treatment target surface is constituted, while ceramic, porcelain, glass, stone, and other such inorganic materials, wooden materials, resin materials, and so forth may be employed, from the standpoints of the beauty, lustrousness, design characteristics, endurance, and so forth of the treatment target surface itself as well as contact and adhesion of the cured body (the anti-slip projections described below) produced by curing of the composition for anti-slip treatment with respect to the treatment target surface, inorganic materials are preferred; and ceramic, stone, and the like are more preferred. While the floor surface layer portion that includes the floor surface is ordinarily constituted from a plurality of tiles arrayed in the horizontal and vertical directions, there being no particular limitation with respect to tile dimensions, these may be chosen as appropriate so as to be from on the order of 10 cm for the horizontal and vertical directions for comparatively small tiles to on the order of 30 cm to on the order of 50 cm for the horizontal and vertical directions for comparatively large tiles. Note that where joints are provided between mutually adjacent tiles in the horizontal and vertical directions, before affixing the masking sheet to the floor surface, tape for preventing the composition for anti-slip treatment from entering thereinto may be affixed to the horizontal and vertical joints. The tape affixed to the horizontal and vertical joints may also be utilized for positioning of the masking sheet.

The masking sheet might, for example, comprise a substrate and an adhesive layer detachably laminated to the surface on one side of the substrate, a plurality of holes extending all the way therethrough in the thickness direction being formed so as to be mutually isolated. While there is no particular limitation with respect to the material(s) of the substrate, based upon consideration of the ease of operations carried out with the masking sheet, it is preferred that that the substrate be polypropylene, polyethylene, polyethylene terephthalate, nylon (trademark), vinyl chloride, and/or other such synthetic resin(s) capable of being cut using scissors, a cutter, or the like at the work site. Furthermore, thickness of the masking sheet, being equal to the height of the through-holes formed by the masking sheet, will have an effect on the height of the anti-slip projections. For example, based upon consideration of the resistance to soiling of the anti-slip projections and the cleanability of the anti-slip structure, it is preferred that thickness of the masking sheet be 30 µm to 2 mm.

There is no particular limitation with respect to the cross-sectional shape in the direction perpendicular to the axes of the through-holes; while this may, for example, be substantially circular, substantially elliptical, substantially oval, substantially rectangular, substantially polygonal with the number of sides being greater than or equal to the number of sides in a pentagon, star-shaped or in any of a variety of other such shapes, based upon consideration of cleanability following curing and so forth, substantially circular, substantially elliptical, substantially oval, substantially square, and the like are preferred; and substantially circular is more preferred. Note that even where through-holes for which the cross-sectional shape is other than circular are employed, it will still be possible by adjusting the viscosity of the composition for anti-slip treatment and so forth to cause anti-slip projections to be formed with dome-like shape. With respect to the diameter of the through-holes, because this has an effect on the diametric dimensions of the anti-slip projections, based on consideration of improvement of pedestrian safety as a result of the anti-slip projections, prevention of situations in which a pedestrian falls as a result of having caught his or her foot on an anti-slip projection, and as improvement of pedestrian safety and so forth, it is preferred that this be in the range 0.3 mm to 25 mm. Furthermore, the diameters of the through-holes may be formed so as to be different at the front versus the back of the masking sheet.

Furthermore, with respect to the arrangement of the plurality of through-holes on the masking sheet, so long as these are mutually isolated there is no particular limitation with respect thereto; while these may, for example, be arranged in regular fashion, e.g., in a lattice-like pattern, in a houndstooth pattern, in a concentric pattern, in a radial pattern, or the like, or these may be arranged in irregular fashion, based upon consideration of anti-slip capability, ease of application to the floor surface, and so forth, it is preferred that these be arranged in regular fashion. Furthermore, while there is no particular limitation with respect to the distance between mutually adjacent through-holes, based upon consideration of improvement of pedestrian safety and anti-slip capability, it is preferred that this be chosen so as to be within the range 1 mm to 50 mm, more preferred that this be chosen so as to be within the range 1 mm to 30 mm, and still more preferred that this be chosen so as to be within the range 2 mm to 20 mm. While distance between mutually adjacent through-holes may be uniform over the entire anti-slip structure formed thereat or it may be nonuniform, from the standpoint of anti-slip capability it is preferred that it be uniform. Furthermore, there being no particular limitation with respect to the fractional area occupied by the openings on the masking sheet, while this may be chosen from a wide range, from the standpoint of ease of operations when forming the anti-slip structure and so forth, it is preferred that this be on the order of 3% to 50%. Furthermore, it is also possible for the anti-slip projections to collectively represent character(s), symbol(s), design(s), and/or the like.

At operation (B), the composition for anti-slip treatment is used to fill the holes formed by the treatment target surface and the through-holes of the masking sheet, and the composition for anti-slip treatment is made to be a temporarily cured body. In causing this to be filled by the composition for anti-slip treatment, a putty knife, trowel, or the like may, for example, be used. After this has been filled therewith, while the composition for anti-slip treatment is ordinarily cured at room temperature, where necessary, a hair dryer or the like may be used to apply heat thereto, and/or curing may be carried out with irradiation of light.

Where, for example, the composition for anti-slip treatment is cured at room temperature, it is preferred that operation (C) begin between a time immediately following filling of holes with the composition for anti-slip treatment and a time 24 hours thereafter. Allowing the composition for anti-slip treatment to remain in the same state it was in upon filling of the holes therewith is sometimes referred to as maturing. Causing the maturing time to be within the foregoing range will cause the composition for anti-slip treatment to become a semi-cured body. What is referred to as semi-cured body means that it is in a state such that some deformation occurs but three-dimensional shape is maintained, there being no loss of three-dimensional shape as a result of planar spreading toward the periphery thereabout by the composition for anti-slip treatment within the holes, when the masking sheet is removed at the next operation, i.e., operation (C). Note that operation (C) may be carried out after the composition for anti-slip treatment with which the holes have been filled has become a semi-cured body, or it may be carried out before the composition for anti-slip treatment has become a semi-cured body, i.e., at a stage during which greater deformation occurs than would be the case were it a semi-cured body. In either case, it is preferred that operation (C) begin at a time chosen to facilitate causing the composition for anti-slip treatment to have dome-like shape, preferably circular dome-like shape, in correspondence to the type of composition for anti-slip treatment employed.

At operation (C), the masking sheet is removed before the temporarily cured body within the holes of the masking sheet cures and loses fluidity. The temporarily cured body within the holes has prescribed fluidity as described above. Accordingly, even after the masking sheet has been removed, the temporarily cured body does not undergo large change in shape, but it does deform in such fashion as to cause the region of the edge-like profile at the boundary between the apical face and the side face to become curved. As a result, the temporarily cured body which is so formed does not have an edge-like profile but is dome-like in shape. At this time, light pressure may be applied to only the apical portion so as to cause it to flatten in such fashion as to not harm the three-dimensional shape of the temporarily cured body and not cause an edge-like profile to be produced at the boundary between the side face and the planar surface which is formed as a result of being pressed thereupon. For application of pressure, a plate, tool, finger, or the like may, for example, be employed. Note that the time it takes for the semi-cured body to attain a state in which fluidity is maintained that is sufficient to permit change in shape to occur as described above may be learned in advance through experiment.

By causing the temporarily cured body to undergo change in shape as described above, the defect observed in conventional anti-slip projections which are in the shape of square prisms, prisms, cylinders, truncated cones, and so forth and which have edge-like profiles, i.e., the defect whereby their external appearance deteriorates over time due to the ease with which dirt from the bottoms of shoes, fibrous debris, dust, and so forth adhere thereto, is eliminated. Furthermore, the anti-slip projections make it possible to prevent impairment of the lustrousness, beauty, design characteristics, and so forth of the treatment target surface. Furthermore, because the edge is rounded so as to become a curved surface, there is also improvement in cleanability. Especially where the cross-sectional shape of the through-holes is substantially circular, substantially elliptical, substantially oval, and/or the like, deformation such as will cause the region of the edge-like profile to become a curved surface results in formation of a substantially circular dome-like shape. Causing this to be a circular dome-like shape makes it possible to all the more markedly prevent the anti-slip projections from appearing darkly soiled, and also improves cleanability.

At operation (D), at the treatment target surface, the temporarily cured body, at which the edges have become curved surfaces and which comprises the composition for anti-slip treatment that adheres to the locations at which the plurality of through-holes of the masking sheet were present, is completely cured, and a plurality of anti-slip projections that have three-dimensional shapes which are dome-like are formed, to obtain the anti-slip structure of the present invention. Note that what is referred to in the context of the present specification as completely cured means that there is absolutely no deformation when allowed to stand without application of an external force thereupon. Curing time at the present operation may be chosen as appropriate in correspondence to the composition of the components in the composition for anti-slip treatment and so forth. Thus, the anti-slip structure of the present invention having a plurality of anti-slip projections that is/are cured body or bodies produced by curing a composition for anti-slip treatment is obtained on the treatment target surface. Note that because anti-slip projections formed using a composition for anti-slip treatment that does not comprise colorant will be colorless and transparent, they possess the advantage that they allow the external appearance of the treatment target surface, especially the lustrousness, beauty, design characteristics, and so forth thereof, to be maintained.

WORKING EXAMPLES

Below, the present invention is described in specific terms with reference to Working Examples and Comparative Examples. Note that the respective components employed in the present Working Examples were as follows. Furthermore, except where otherwise stated below, parts and percents are as measured by weight.

Cross-Linking Silyl-Group-Containing Polymer

Product name Silyl MA480; manufactured by Kaneka Corporation; acrylic acid ester-type polymer having cross-linking silyl group(s)

Product name Silyl SAX520; manufactured by Kaneka Corporation; polyoxypropylene having cross-linking silyl group(s)

Alkoxy-Group-Containing Silicone Oligomer

Product name KR-510; manufactured by Shin-Etsu Chemical Co., Ltd.; at General Formula (1), $R^1$=methyl groups, $R^2$=methyl group(s) and phenyl group(s), m=10; viscosity (25° C.) 100 $mm^2$/s; refractive index (25° C.) 1.509; methyl group content 17 wt %

Curing catalyst: Product name U303; manufactured by Nitto Kasei Co., Ltd.; tin catalyst (dibutyltin).

Silane Compound

Product name: KMB-903; manufactured by Shin-Etsu Chemical Co., Ltd.; 3-aminopropyltrimethoxysilane Product name: KBM-13; manufactured by Shin-Etsu Chemical Co., Ltd.; methyltrimethoxysilane Note that the foregoing compounds may be referred to in abbreviated fashion using their product names.

Curable Resin Cured as a Result of Condensation and Addition Reactions

The following three curable resins are capable of being cured at room temperature.

Silicone resin Product name: 2540NS; moisture-curable type; 80 mPa·s viscosity at 20° C.; manufactured by Sunstar Engineering Inc.

Epoxy resin Product name: Alpron G-250; two-liquid type; 2000 mPa·s viscosity at 20° C.; manufactured by Nichibei Resin Co., Ltd.

Urethane resin Product name: Penguin Cement #936; 10000 mPa·s viscosity at 20° C.; manufactured by Sunstar Engineering Inc.

Photocurable Resin

Photocurable acrylic resin Product name: Kraft Resin UV004; 3500 mPa·s viscosity at 20° C.; manufactured by Tesk Co., Ltd.

WORKING EXAMPLES 1-9

A shaking-type kneader (product name: SHAKER SA300; manufactured by Yamato Scientific Co., Ltd.) was used to uniformly mix curable polymer component (MA-480 or SAX520), curable oligomer component (KR510), tin catalyst (U303), silane compound (KBM903), and silane compound (KBM13) in the proportions (g) indicated at TABLE 1 to prepare the curable resin compositions of Working Examples 1 through 9. Viscosities and viscosity ratios of the respective compositions that were obtained were calculated. Furthermore, the respective compositions that were obtained were used to carry out the fingernail scrape test, taper abrasion test, and cross-cut adhesion test which are described below. Results are shown together in TABLE 1.

Viscosity and Viscosity Ratio

A BH-type viscometer (product name: B-Type Viscometer Model BH; manufactured by Tokimec Inc.) was used to determine the value of the viscosity measured for each of the respective compositions when 2 rotations or 20 rotations were carried out at 20° C. and rotational velocity 20 rpm. The rotor used to carry out measurement was changed to correspond to the approximate viscosity of each respective composition.

Fingernail Scrape Test

The fingernail scrape test was carried out using the following procedure.

1) The surface of a ceramic tile (10 cm×10 cm) was cleaned with a paper tissue that had been dampened with acetone.

2) A masking sheet (200 μm thickness; 3.5 mm diameter of circular through-holes; 12% fractional area occupied by openings on masking sheet; 10 mm distance between circular through-holes) was affixed to the surface of the ceramic tile.

3) A putty knife was used in squeegee-like fashion to cause the holes formed by the masking sheet and the ceramic tile to be filled with each of the respective compositions of Working Examples 1 through 9.

4) Following maturing at room temperature for 1 day, the masking sheet was removed to form a plurality of anti-slip projections of circular dome-like shape on the ceramic tile.

5) The anti-slip projections that were obtained were allowed to stand for 3 days at room temperature, and for 4 days in an 80° C. environment.

6) The anti-slip projections of circular dome-like shape were thereafter scraped 5 times using the fingernail of the thumb, evaluation being carried out such that this was deemed to be GOOD (pass) if the projections did not become squashed or delaminate, FAIR (barely pass) if one projection became squashed and/or delaminated, and BAD (fail) if a plurality of projections became squashed and/or delaminated.

Taper Abrasion Test

The taper abrasion test was carried out using the following procedure. 1) through 3) were carried out in similar fashion as at the fingernail scrape test.

4) Immediately after all of the holes formed by the circular through-holes of the masking sheet and the ceramic tile were filled with the respective compositions, the masking sheet was removed, and these were allowed to stand at room temperature for 60 minutes, allowing them to deform and cure, to form a plurality of anti-slip projections of circular dome-like shape on the ceramic tile.

5) A laser displacement measuring device (product names: LK080, LK2100, RV45; manufactured by Keyence Corporation) was used to measure the heights of 10 of the anti-slip projections that were obtained, the arithmetic mean of the values obtained being taken to be the initial height ($\mu$m) thereof 6) Next, these were allowed to stand at room temperature for 72 hours, following which polishing testing of the anti-slip projections of circular dome-like shape was performed. For polishing, an abrasion test device (product name: ABRASIO TESTER; manufactured by Yasuda Seiki Seisakusho, Ltd.) as described at JISK 5600-5-9 was used, with a load of 500 g and a CS-17 abrasion wheel being used, and the height of the anti-slip projections after 700 abrasion iterations was measured in the same manner as at 5), above. When height of the anti-slip projections was greater than or equal to 40 $\mu$m, this was taken to be GOOD (pass); when height thereof was less than 40 $\mu$m, this was taken to be BAD (fail).

Cross-Cut Adhesion Test

The cross-cut adhesion test was carried out using the following procedure.

1) The surface of a ceramic tile (10 cm×10 cm) was cleaned with a paper tissue that had been dampened with acetone.

2) Masking tape was applied in overlapping fashion to the four sides of the ceramic tile so as to cause thickness to be 200 $\mu$m.

3) Each of the respective compositions was poured into the region enclosed by masking sheet, a putty knife being used in squeegee-like fashion to cause thickness to be uniform.

4) These were allowed to stand for 1 day at room temperature, or were allowed to stand for 1 day at room temperature and for 1 day in an 80° C. environment.

5) Cross-cut adhesion testing was performed using a lattice having a spacing of 2 mm in accordance with JISK5600-5-6.

6) At the evaluative criteria below, an evaluation of 0 to 2 was taken to be GOOD (pass), and an evaluation of less than or equal to 3 was taken to be BAD (fail).

Evaluative Technique

Evaluated as 0: Edges where film has been cut are completely smooth and there is no delamination at any cell of the lattice.

Evaluated as 1: Some slight delamination of film occurs at intersections of cuts. Slight delamination of film occurring at regions where cuts intersect is not more than 5% of all intersecting regions.

Evaluated as 2: There is delamination at cut intersections and/or along edges where film is cut. Delamination of film occurring at regions where cuts intersect is greater than 5% but not more than 15% of all intersecting regions.

Evaluated as 3: There is partial or complete bulk delamination occurring along edges where film is cut, and/or there is partial or complete delamination at various locations within a cell. Partial or complete bulk delamination of film occurring at regions where cuts intersect is greater than 15% but not more than 35% of all intersecting regions.

Evaluated as 4: There is partial or complete bulk delamination occurring along edges where film is cut, and/or there is partial or complete delamination at cells in various locations. Partial or complete bulk delamination of film occurring at regions where cuts intersect is greater than 35% of all intersecting regions.

Evaluated as 5: Extent of delamination of film is greater than that which is evaluated as 4.

Note that maximum height and maximum diameter of anti-slip projections indicated at TABLE 1, below, were respectively measured using a depth gauge (DIAL DEPTH GAUGE T-6B manufactured by Ozaki Manufacturing Co., Ltd.) and calipers (DIGITAL CALPER DN-150 manufactured by Niigata Seiki Co., Ltd.). Furthermore, at the amounts entered in the rows for curable oligomer component and curable polymer component in the section entitled "Composition" at TABLE 1, below, numbers in upper portions of cells indicate actual weight (g) of the amount blended therein, and numbers in lower portions of cells indicate fractional amount (wt %) relative to the total amount of curable component. Furthermore, numbers entered in the rows for tin catalyst and silane compound in the section entitled "Composition" at TABLE 1, below, indicate actual weight (g) of the amount blended therein.

TABLE 1

| | | Working Example | | | | | | | | |
|---|---|---|---|---|---|---|---|---|---|---|
| | | 1 | 2 | 3 | 4 | 5 | 6 | 7 | 8 | 9 |
| Composition | Curable oligomer | 12.50 | 9.30 | 7.75 | 6.20 | 3.10 | 3.10 | 7.75 | 14.73 | 0.78 |
| | (KR-510) | 80.65 | 60.00 | 50.00 | 40.00 | 20.00 | 20.00 | 50.00 | 95.00 | 5.00 |
| | Curable polymer | 3.00 | 6.20 | 7.75 | 9.30 | 12.40 | 12.40 | | 0.78 | 14.73 |

TABLE 1-continued

| | | Working Example | | | | | | | | |
|---|---|---|---|---|---|---|---|---|---|---|
| | | 1 | 2 | 3 | 4 | 5 | 6 | 7 | 8 | 9 |
| | (MA-480) | 19.35 | 40.00 | 50.00 | 60.00 | 80.00 | 80.00 | 7.75 | 5.00 | 95.00 |
| | Curable polymer (SAX520) | | | | | | | 50.00 | | |
| | Tin catalyst (U303) | 1.20 | 1.20 | 1.20 | 1.20 | 1.20 | 1.20 | 1.20 | 1.20 | 1.20 |
| | Silane compound (KBM-903) | 1.80 | 1.80 | 1.80 | 1.80 | | 1.80 | 1.80 | 1.80 | |
| | Silane compound (KBM13) | 2.70 | 2.70 | 2.70 | 2.70 | | 2.70 | 2.70 | 2.70 | |
| | Total (g) | 21.20 | 21.20 | 21.20 | 21.20 | 16.70 | 21.20 | 21.20 | 16.70 | 21.20 |
| Anti-slip projection | Maximum diameter of anti-slip projection (mm) | 3.30 | 3.25 | 3.28 | 3.28 | 3.02 | 3.04 | 3.28 | 3.50 | 3.00 |
| | Maximum height of anti-slip projection (mm) | 0.20 | 0.21 | 0.22 | 0.30 | 0.30 | 0.23 | 0.21 | 0.15 | 0.30 |
| | Aspect ratio (maximum diameter/maximum height) (mm) | 16.5 | 15.5 | 14.9 | 10.9 | 10.1 | 13.2 | 15.6 | 23.3 | 10.0 |
| Evaluation | Contact angle (°) | 20 | 20 | 20 | 20 | 21 | 20 | 20 | 19 | 54 |
| | Viscosity (mPa · s) | 82.5 | 237.5 | 392.5 | 550.0 | 25000 | 1354 | 330.5 | 35.0 | 112000 |
| | Fingernail scrape test (after 4 days at 80° C.) | GOOD | GOOD | GOOD | GOOD | GOOD | GOOD | GOOD | FAIR | FAIR |
| | Taper abrasion test (μm) Initial value | 96 | 86 | 94 | 96 | 96 | 90 | 92 | 88 | 98 |
| | Taper abrasion test (μm) After 700 iterations | 42 | 44 | 46 | 46 | 46 | 54 | 45 | 34 | 38 |
| | Cross-cut adhesion test After 24 hr at room temperature | 0 | 0 | 0 | 0 | 0 | 0 | 0 | 0 | 0 |
| | Cross-cut adhesion test After 1 day at 80° C. | 0 | 0 | 0 | 0 | 0 | 0 | 0 | 4 | 0 |

At the taper abrasion test shown at TABLE 1, note that upon visually inspecting the anti-slip projections making up the anti-slip structure after 700 iterations, it was found that the anti-slip structures at Working Examples 2 through 7 had maintained satisfactory anti-slip capability, there being no anti-slip projection that was even partially deficient. Furthermore, at the anti-slip structure of Working Example 1, while a very small number of anti-slip projections that were partially deficient were observed, it was found that anti-slip capability was maintained. On the other hand, at the anti-slip structures of Working Examples 8 and 9, height of the anti-slip projections was less than 40 mm, wear being greater than was the case at Working Examples 1 through 7, and the number of anti-slip projections having comparatively large deficiencies was greater than at Working Example 1, and the anti-slip capability thereof was also found to be inferior to that of Working Examples 1 through 7.

WORKING EXAMPLE 10

A shaking-type kneader (SHAKER SA300) was used to uniformly mix 12.5 g of curable polymer component (SAX520), 3.0 g of curable oligomer component (KR510), 1.20 g of tin catalyst (U303), 1.80 g of silane compound (KBM903), and 2.70 g of silane compound (KBM13) to prepare a composition for anti-slip treatment in accordance with the present invention (viscosity 82.5 mPa·s). Using the composition that was obtained, thickness (μm) of the masking sheet, diameter (mm) of the circular through-holes, distance (mm) between mutually adjacent circular through-holes, and fractional area (%) occupied by openings were varied, and anti-slip structures in accordance with the present invention, each of which comprised a plurality of anti-slip projections, were formed and evaluated in accordance with the following procedure.

1) The surface of a ceramic tile (10 cm×10 cm) was cleaned with a paper tissue that had been dampened with acetone.

2) Masking sheets having the respective specifications indicated at TABLE 2 (thickness, through-hole diameter, distance between through-holes, and fractional area occupied by openings) were affixed to ceramic tile.

3) A putty knife was used in squeegee-like fashion to cause the holes formed by the through-holes of the masking sheet and the ceramic tile to be filled with the composition obtained above.

4) Immediately after filling of the holes with the composition was completed, the masking sheet was removed, and these were allowed to stand at room temperature for 72 hours, causing anti-slip projections to be formed which were such that the cylindrical shape immediately following removal of the masking sheet had deformed to become dome-like in shape, to fabricate an anti-slip structure in accordance with the present invention.

5) The CSR value (coefficient of slip resistance) of the anti-slip structure that was obtained was measured under water and dust conditions in accordance with JIS A1454 and JIS A5705, a value of 0.40 or higher being taken to indicate a passing grade.

6) Furthermore, luster in the region at which the anti-slip structure was formed on the ceramic tile was measured using a luster measuring device (product name: GM-268; manufactured by Konica Minolta, Inc.), a value of 50 or higher being taken to indicate a passing grade.

Results are shown in TABLE 2.

At TABLE 2, note that "Blank" refers to the CSR value and luster of the ceramic tile. Furthermore, N=1 and N=2 at the row for fractional area occupied by openings reflects the fact that two specimens were employed; and N=1, N=2, and N=3 at the row for luster reflects the fact that luster of one specimen was measured in three trials.

TANGYA LED lamp) to cause this to be completely cured. In this way, a plurality of anti-slip projections of circular dome-like shape having a maximum diameter of 3.30 mm, a maximum height of 0.20 mm, and an aspect ratio (maxi-

TABLE 2

| Thickness (μm) | 300 | | | | | | | 200 | | Blank |
|---|---|---|---|---|---|---|---|---|---|---|
| Through-hole diameter (mm) | 1.5 | 2.0 | | 2.0 | | | 2.6 | 3.5 | 2.0 | |
| Distance between through-holes (mm) | 8.0 | 6.0 | | 9.0 | 11.0 | | 14.0 | 10.0 | 9.0 | |
| Fractional area occupied by openings (%) | 3.2 | 9.8 N=1 | N=2 | 5.2 | 3.2 N=1 | N=2 | 6.0 | 12.0 | 5.2 | |
| CSR value | 0.465 | 0.526 | 0.528 | 0.474 | 0.431 | 0.448 | 0.454 | 0.479 | 0.441 | 0.330 |
| Luster N=1 | 78.7 | 73.0 | 67.7 | 76.3 | 80.1 | 79.4 | 80.6 | 77.6 | 77.6 | 88.9 |
| N=2 | 74.9 | 74.8 | 68.2 | 78.8 | 82.3 | 81.2 | 77.8 | 79.9 | 80.6 | 88.4 |
| N=3 | 75.8 | 72.2 | 72.7 | 73.4 | 81.6 | 83.6 | 76.1 | 73.4 | 80.4 | 85.9 |
| Average | 76.5 | 73.3 | 69.5 | 76.2 | 81.3 | 81.4 | 78.2 | 77.0 | 79.5 | 87.7 |

From TABLE 2, it can be seen that the present invention makes it possible to choose thickness (μm) of the masking sheet, diameter (mm) of the circular through-holes, distance (mm) between mutually adjacent circular through-holes, and fractional area (%) occupied by openings, i.e., height and diameter of the anti-slip projections, distance between the anti-slip projections, and number of the anti-slip projections, from wide ranges therefor, and to maintain luster to such an extent as to be visually nearly indistinguishable from that of the blank (ceramic sheet) while forming an anti-slip structure having anti-slip capability that is markedly superior to that of the blank.

WORKING EXAMPLES 11-14

As composition for anti-slip treatment, silicone resin (2540NS; Working Example 11), photocurable acrylic resin (Kraft Resin UV004; Working Example 12), epoxy resin (Alpron G-250; Working Example 13), or urethane resin (Penguin Cement #936; Working Example 14) was used to fabricate an anti-slip structure in accordance with the present invention which comprised a plurality of anti-slip projections of circular dome-like shape in accordance with the following procedure.

1) The surface of a ceramic tile (10 cm×30 cm) was cleaned with paper tissue (product name: Kimwipe (trademark); manufactured by Nippon Paper Crecia Co., Ltd.) that had been dampened with acetone.

2) A masking sheet (300 μm thickness; 3 mm diameter of circular through-holes; 17.4% fractional area occupied by openings on masking sheet; 6 mm distance between circular through-holes; manufactured by Oji Tac Co., Ltd.) was affixed to the surface of the ceramic tile.

3) A trowel was used in squeegee-like fashion to cause the holes formed by the masking sheet and the ceramic tile to be filled with each of the respective compositions for anti-slip treatment of Working Examples 11 through 14.

4) After allowing this to stand at room temperature for 1 minute, the masking sheet was removed, allowing the composition for anti-slip treatment on the ceramic tile to deform into circular dome-like shapes, to obtain a temporarily cured body. Where the composition for anti-slip treatment was of the room-temperature-curable type or the moisture-curable type, the temporarily cured body was matured for 24 hours at room temperature to cause this to be completely cured. Furthermore, the temporarily cured body that comprised photocurable-type acrylic resin was irradiated with ultraviolet light for 30 seconds using a special-purpose lamp (8W TANGYA LED lamp) to cause this to be completely cured. In this way, a plurality of anti-slip projections of circular dome-like shape having a maximum diameter of 3.30 mm, a maximum height of 0.20 mm, and an aspect ratio (maximum diameter/maximum height) of 16.5 were formed with a uniform distance therebetween of approximately 6 mm to fabricate an anti-slip structure in accordance with the present invention.

5) For comparative purposes, after carrying out the operations at 1) through 3), above, the composition for anti-slip treatment with which filling was carried out was completely cured in similar fashion as at 4), above, except that this was carried out in a state in which the masking sheet was not removed therefrom, to fabricate an anti-slip structure comprising a plurality of cylindrical anti-slip projections (of diameter 3.00 mm and height 0.30 mm).

Working Examples 11 through 14 and the anti-slip projections for comparison that were obtained were subjected to the following evaluative tests. Results are shown in TABLE 3.

Fingernail Scrape Test

The respective anti-slip projections obtained above were stored for 7 days at room temperature or in an 80° C. environment, following which evaluation was carried out using a procedure similar to that employed at Working Example 1. The fingernail scrape test is a test for evaluating the contact and adhesion of the anti-slip projections with respect to the floor surface.

Ease of Use of Cleaning Accoutrements

A 150 g weight was wrapped in a single paper tissue (Kimwipe), and the value of the frictional resistance when this was made to slide over the surface of the anti-slip structure was measured using a digital-type pushable gauge (product name: DSP-50; manufactured by Imada Co., Ltd.). The lower the value of the frictional resistance the better the ease of use of mops and other such cleaning accouterments.

Ease of Removing Dirt Adhering Thereto

Beef tallow and soybean oil were mixed in a wt % ratio of 1:1 to prepare an oil mixture. This oil mixture was dissolved in chloroform to prepare 25 wt % solution of the oil mixture in chloroform. Red dye (NP Scarlet BN: Toya Senryo Co., Ltd.) was added to and mixed with this solution in a ratio of 0.1 wt % to obtain a soiling solution. An eyedropper was used to cause 3 drops of this soiling solution to fall on the surface of the respective anti-slip projections, and this was allowed to stand for 60 minutes. The locations at which the soiling solution had been made to fall on the respective anti-slip projections were thereafter cleaned by wiping with paper tissue (Kimwipe) that had been dampened with water, this being evaluated as GOOD if the red color was completely wiped away, as FAIR if only a very small amount remained, and as BAD if the red color obviously remained.

Tendency for Dirt to Adhere Thereto

A white brush on which 0.01 g of carbon powder had been made to adhere was used to brush the surface of the respective anti-slip projections with a single back-and-forth movement, and visual inspection was employed to determine the extent to which the carbon powder had migrated to the surface of the anti-slip projections, this being evaluated as GOOD if only a very small amount of carbon powder had migrated thereto such that that no change in the external appearance of the anti-slip projections was observed, and as BAD if a comparatively large amount of carbon powder had migrated thereto such that the surface of the anti-slip projections had taken on a dark appearance.

Weather Resistance

The respective anti-slip projections were irradiated with ultraviolet light for 72 hours using a super-accelerated weathering test device (product name: EYE SUPER-W261; manufactured by Iwasaki Electric Co., Ltd.), following which these were visually inspected for presence of discoloration (yellowing), this being evaluated as GOOD if there was no discoloration, and as BAD if there was discoloration.

Anti-Slip Capability

The CSR value was determined in similar fashion as at Working Example 10, a value of 0.40 or higher being taken to indicate a passing grade.

TABLE 3

|  |  | Working Example 11 | | Working Example 12 | | Working Example 13 | | Working Example 14 | |
|---|---|---|---|---|---|---|---|---|---|
| Composition for anti-slip treatment | | Modified silicone resin | | Acrylic resin | | Epoxy resin | | Urethane resin | |
| Three-dimensional shape of anti-slip projections | | Circular dome-like | Cylindrical | Circular dome-like | Cylindrical | Circular dome-like | Cylindrical | Circular dome-like | Cylindrical |
| Fingernail scrape test | After 7 days at room temp. | GOOD | GOOD | GOOD | BAD | GOOD | GOOD | GOOD | BAD |
| | After 7 days at 80° C. | GOOD | GOOD | GOOD | BAD | GOOD | GOOD | GOOD | BAD |
| Ease of use of cleaning accoutrements | | 0.09 | 0.32 | 0.13 | 0.3 | 0.12 | 0.42 | 0.15 | 0.48 |
| Ease of removing dirt adhering thereto | | GOOD | BAD | FAIR | BAD | GOOD | BAD | FAIR | BAD |
| Tendency for dirt to adhere thereto | | GOOD | BAD | GOOD | BAD | GOOD | BAD | GOOD | BAD |
| Weather resistance | | GOOD | GOOD | GOOD | GOOD | FAIR | BAD | FAIR | BAD |
| Anti-slip capability | | 0.59 | 0.61 | 0.57 | 0.60 | 0.58 | 0.62 | 0.56 | 0.59 |

From TABLE 3, it can be seen that use of a composition for anti-slip treatment comprising photocurable resin or curable resin that cures as a result of an addition reaction to form anti-slip projections that are of circular dome-like shape makes it possible to form an anti-slip structure that is effective especially for indoor use and which has satisfactory anti-slip capability while also permitting achievement of high levels of performance in terms of various capabilities including adhesion with respect to the floor surface, ease of use of cleaning accoutrements, ease of removing dirt adhering thereto, prevention of dirt from adhering thereto, and so forth, without impairing the beauty, design characteristics, and so forth of the floor surface.

The invention claimed is:

1. An anti-slip structure comprising a plurality of anti-slip projections that protrude outwardly from a floor surface and are arranged so as to be mutually isolated, the anti-slip structure being such that the anti-slip projections are of dome-like three-dimensional shape and are cured bodies produced by curing a composition for anti-slip treatment comprising a curable resin, wherein the composition for anti-slip treatment is a curable composition containing at least one resin selected from moisture-curable resin, the moisture-curable resin comprises 8 wt % to 92 wt % of cross-linking silyl-group-containing polymer, and 8 wt % to 92 wt % of alkoxy-group-containing silicone oligomer, the alkoxy-group-containing silicone oligomer is represented by a General Formula (1) as follows:

wherein $R^1$ indicates an alkyl group; $R^2$ indicates an alkyl group, an aryl group, or a reactive functional group; m indicates an integer from 2 to 100 which is the number of repetitions of the monomer unit; m instances of $R^1$ and m instances of $R^2$ are respectively the same or different, a maximum height of the anti-slip projections from the floor surface is at a range of at least 0.03 mm to at most 0.3 mm, and viscosity (20° C.) of the composition for anti-slip treatment as measured using a BR-type rotational viscometer (20 rpm) is within a range that is greater than 35 mPa·s and less than 112000 mPa·s.

2. The anti-slip structure according to claim 1 wherein a maximum diameter (mm) at faces of the anti-slip projections that conic in contact with the floor surface divided by a maximum height (mm) thereof from the floor surface (the maximum diameter/the maximum height) is within a range that is 1 to 600.

3. The anti-slip structure according to claim 1 wherein maximum diameter at faces of the anti-slip projections that come in contact with the floor surface is within a range that is 0.3 mm to 25 mm.

4. The anti-slip structure according to claim 1 contact angle of the anti-slip projections is in a range that is 1° to 80°.

5. The anti-slip structure according to claim 1 wherein distance between an adjacent pair of the anti-slip projections is in a range that is 1 mm to 50 mm.

6. The anti-slip structure according to claim 1 wherein a floor surface layer portion that includes the floor surface is at least one species selected from among a group consisting of ceramic material and stone material.

7. The anti-slip structure according to claim 1, further comprising at least one silane compound selected from among a group consisting of aminosilane, alkylalkoxysilane, epoxysilane, mercaptosilane, isocyanate silane, and acrylsilane.

8. The anti-slip structure according to claim 1, wherein the cross-linking silyl-group-containing polymer has
 a main chain skeleton selected from among a group consisting of polyoxyalkylene, polyoxyalkylene ether, and (meth)acrylic acid ester-type polymer, and
 a cross-linking silyl group bonded to at least one species selected from among an end and a side chain of the marry chain skeleton; and
 an average number of the cross-linking silyl-groups per molecule is not less than 0.7.

9. The anti-slip structure according to claim 8, wherein
 the cross-linking silyl-group is a group in which 1 to 3 cross-linking groups have been substituted into a silyl group; and
 the group substituted into the silyl group is at least one species selected from among a group consisting of hydrogen atom, halogen atom, alkoxy group, acyloxy group, ketoximate group, amino group, amide group, acid amide group, aminooxy group, mercapto group, alkenyl group, and alkenyloxy group.

10. The anti-slip structure according to claim 1, wherein
 the alkoxy-group-containing silicone oligomer has an alkoxy group in the form of at least one species selected from among methoxy group and ethoxy group, and
 an organic substituent group in the form of at least one species selected from among alkyl group having 1 to 4 carbons and phenyl group; and
 the alkoxy-group-containing silicone oligomer comprises 2 to 40 monomer units of a silane compound having no reactive functional group.

* * * * *

UNITED STATES PATENT AND TRADEMARK OFFICE
CERTIFICATE OF CORRECTION

PATENT NO. : 11,136,460 B2
APPLICATION NO. : 15/763635
DATED : October 5, 2021
INVENTOR(S) : Hirokazu Okamoto et al.

Page 1 of 1

It is certified that error appears in the above-identified patent and that said Letters Patent is hereby corrected as shown below:

In the Claims

Column 30, Line 55:
"a BR-type"
Should read:
--a BH-type--

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*